United States Patent

Hirs

[15] 3,655,248
[45] Apr. 11, 1972

[54] BEARINGS AND SEALS WITH A GROOVED BEARING SURFACE

[72] Inventor: Gilles Gerardus Hirs, Pijnacker, Netherlands

[73] Assignee: Nederlandse Organisatie Voor Toegepast-Nathuurweten-Schappelijk Onderzoek Ten Behoeve Van Nijverheid, Handel En Verkeer, The Hague, Netherlands

[22] Filed: July 20, 1970

[21] Appl. No.: 56,254

[30] Foreign Application Priority Data

July 22, 1969 Netherlands..........................6911255

[52] U.S. Cl..................................308/9, 308/36.3, 308/240
[51] Int. Cl........................................................F16c 35/00
[58] Field of Search................308/241, 9, DIG. 4, 240, 36.3, 308/DIG. 1

[56] References Cited

UNITED STATES PATENTS

| | | | |
|---|---|---|---|
| 3,420,583 | 1/1969 | Hirs | 308/9 |
| 3,439,962 | 4/1969 | Gothberg | 308/9 |
| 3,467,449 | 9/1969 | Moijderman | 308/9 |
| 3,517,973 | 6/1970 | Hirs | 308/9 |
| 2,663,599 | 12/1953 | Mackay et al | 308/DIG. 4 |
| 3,441,328 | 4/1969 | Hurley et al. | 308/241 X |
| 1,646,371 | 10/1927 | Shoemaker | 308/241 X |
| 3,146,036 | 8/1964 | Benatti | 308/9 |
| 3,150,822 | 9/1964 | Dreyfus et al. | 308/9 X |

*Primary Examiner*—Martin P. Schwadron
*Assistant Examiner*—Barry Grossman
*Attorney*—Hammond & Littell

[57] ABSTRACT

In bearings and seals comprising a grooved surface for the dynamical generation of back pressure in the lubricant film, the effect of the grooves is considerably less than proportional to the breadth of the bearing or seal if the breadth to diameter ratio is in the usual range of 0.5 to 2 or more. The proportional relationship is restored by composing each groove of two or more separated shorter grooves. At the same time the grooves' tendency of transporting pollutions in the lubricant into the gap and collecting them there, is suppressed.

4 Claims, 2 Drawing Figures

Patented April 11, 1972

3,655,248

INVENTOR.
GILLES GERARDUS HIRS
BY

ATTORNEYS

BEARINGS AND SEALS WITH A GROOVED BEARING SURFACE

The invention relates to bearings and seals with a hydrodynamical or aerodynamical pressure generation in the lubricant between the bearing surfaces, at least one of the bearing surfaces being provided with recesses that form a regular pattern of unidirectional, shallow grooves for exercising transversely to the direction of movement of the bearing surfaces a stemming effect on the lubricant.

Such bearings and seals are known in the art in a great variety of designs. As a rule the radial or cylindrical designs have helical grooves and the axial or plane designs spiral grooves. Intermediates of these two types are known in the art, too.

The grooves are designed to maintain the lubricant film between the bearing surfaces and a certain pressure generation in it in order to improve the carrying capacity and the stability of the equilibrium between the resultants of the differences in pressure and the external forces.

In many cases it has been found that the grooves did not come up to the expectations; they are seen to have the effect desired, though, but not to the extent desired. At radially loaded cylindrical bearings, for instance, the following was established by means of experiments and calculations:

The component of the carrying capacity, which is the result of the stemming effect of the grooves, increases approximately proportional to the breadth at a breadth diameter ratio smaller than approximately 0.2. This component of the carrying capacity increases, however, much less than proportional to the breadth at the breadth diameter ratio of 1 to 2 usual in practice and even starts to decrease at still greater ratios.

A second component of the carrying capacity is the result of the wedge effect: the lubricant is transported into a narrowing slit by the rotation of the shaft and through this is pressurized. This component of the carrying capacity increases by approximately the square of the breadth at the said small breadth diameter ratio, whereas at the greater breadth diameter ratio the increase of this component is much smaller, too.

Both said phenomena are attributed to the fact that at a greater breadth diameter ratio a groove covers a larger part of the periphery of the bearing and begins to form a short-circuit for the differences in pressure over the periphery of the shaft from which the bearing derives its carrying capacity. The same occurs in other bearing constructions and in seals and here also results in the fact that not the full benefit from the grooves is derived.

It has further been found that in grooved bearings and seals with in the slit a free boundary surface of the lubricant and the surrounding medium, this medium, usually air, is absorbed into the lubricant, usually oil or grease, via the boundary layer and is transported in the slit to places with a higher pressure.

This can be explained by the combination of the phenomenon that the lubricant is transported transversely to the direction of sliding to the inside in a groove and to the outside on a dam between the grooves and the phenomenon that small particles, such as air bubbles, in a laminar flow are landed there where the shear stress is the smallest, which is the case on the bottom of the grooves.

In bearings without a circulation or regular renewal of the lubricant this leads to a reduced service life of the lubricant film and the bearing; in seals the results are oil leakage from and gas leakage through the seal.

It is the object of the invention to improve grooved bearings and seals in the respects described above by reducing the adverse effects of the grooves and thus increasing the carrying capacity and the service life of bearings and decreasing the leakage of seals.

For this purpose the bearings and seals according to the invention are characterized in that the groove pattern is composed of grooves with a limited length, which are arranged longitudinally after one another in at least two groups.

In such a groove pattern the long, continuous grooves used so far are interrupted by bearing surface parts that check the short-circuit currents and see to it that the air bubbles and other particles in the lubricant are not transported further into the slit than to the end of the first groove. The stemming effect on the contrary is practically undiminished and is used to the full with broad bearing surfaces, too.

The dimensions of the grooves with which an optimum effect is obtained, depend on the circumstances, and the requirements thereby can differ highly in each individual case. In general it may be adopted that like with the groove patterns known in the art the depth must be smaller than 5 times the average lubricant-film thickness, the breadth, of both the groove and the bearing surface part between the grooves, greater than 5 times the average lubricant-film thickness and the angle of the grooves with respect to the relative direction of movement of the bearing surfaces approximately 10°–40°.

For the extent to which the effect aimed at by the invention is obtained, the length of the grooves and the distance between the grooves situated after one another are of importance. In this connection the bearings and seals according to the invention are preferably characterized in that the length of the grooves is at least 10 times their breadth, because at a smaller length the directional effect and by this the pumping action of the grooves is affected.

At the same time it is preferred that according to a further characteristic of the invention the shortest distance between two grooves situated after one another is at least as great as the shortest distance between two juxtaposed grooves. It has been found that shorter groove interruptions are less effective.

The invention is further elucidated below with reference to the drawing.

Figure 1:
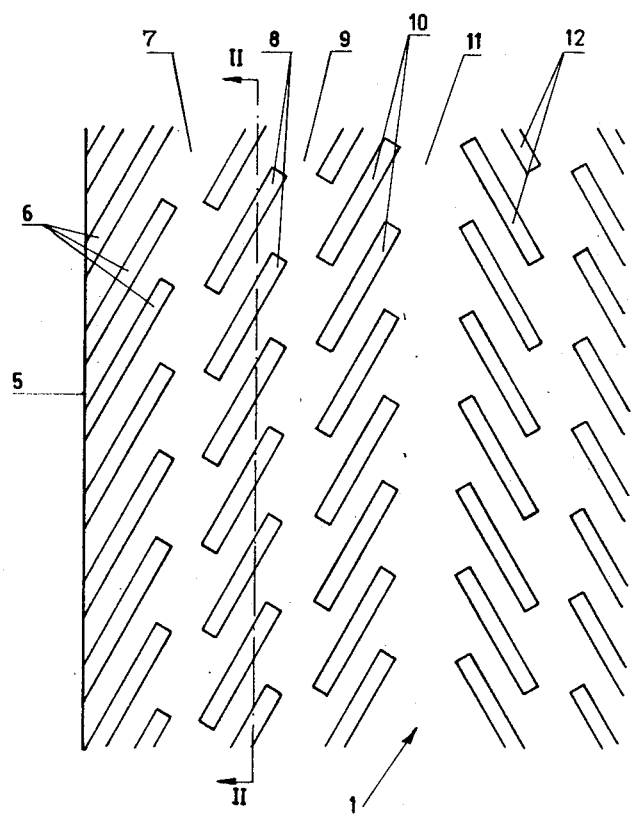
FIG. 1 is a view of a grooved surface according to the invention.

Surfaces 1 and 2 are interco-operating bearing surfaces of a bearing or a seal. Bearing surface 2 moves in the direction of arrow 3 with respect to bearing surface 1 and at some distance of it, so that between bearing surfaces 1 and 2 there is a slit 4. In the drawing slit 4 is drawn highly enlarged for clearness' sake; in reality the slit width is, for instance, in the order of magnitude of 0.1 mm.

Alongside its edge 5 bearing surface 1 is provided with grooves 6, which all have the same direction with respect to edge 5 of bearing surface 1 and direction of movement 3. Grooves 8 have been provided separated from grooves 6 by an ungrooved bearing surface section 7. Thereafter follow again an ungrooved bearing surface section 9 and grooves 10.

Figure 2:
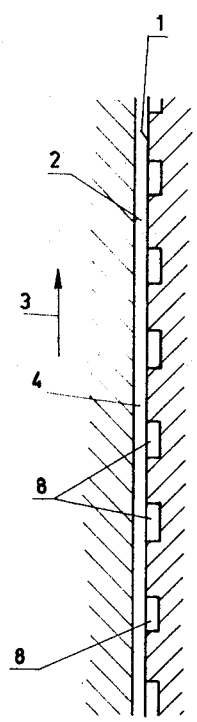
FIG. 2 is a cross-section along line II—II in FIG. 1 through the grooved bearing surface and the smooth one belonging to it.

Grooves 8 and 10 have approximately the same dimensions and direction as grooves 6. Their depth is shown highly enlarged in FIG. 2 and in reality is of the same order of magnitude as the width of slit 4.

Next to grooves 10 bearing surface 1 again has a smooth section 11 and then a section 12 provided with grooves. Grooves 12 and the following grooves, if any, which are not drawn, the provided in the same way, slantingly with respect to the direction of movement 3, but in the opposite direction.

Grooves 6, 8 and 10 and intermediate smooth bearing surface sections 7 and 9 together form a pattern of unidirectional grooves, which as a result of the movement of bearing surface 2 on the lubricant in slit 4, exercises a pumping action in the direction of smooth bearing surface section 11 and generates a pressure increasing from edge 5.

In direction of movement 3 the pressure generation can differ from place to place when slit 4 between bearing surfaces 1 and 2 is not everywhere of a uniform width as a result of an exterior load.

These differences in pressure, which produce the carrying force of the bearing or the back pressure of the seal, would, if the groove pattern should exist of continuous grooves from edge 5 to smooth bearing surface section 11, partially be neutralized by these grooves. With the groove pattern according to FIG. 1 this does not happen, because smooth bearing surface sections 7 and 9 interrupt the connection between the differences in pressure and form an effective separation. For this purpose it is of importance that the distance from a groove 6 to nearest groove 8 is at least as great as the distance between two grooves 6 or 8 situated side by side. The same holds for the distance between grooves 8 and 10. It is of no importance, whether grooves 6, 8 and 10 are staggered with respect to each other, such as in the arrangement according to FIG. 1, or are in line. Neither is it necessary that, for instance, grooves 8 are identical to grooves 6, nor that their numbers are the same; with cylindrical bearing surfaces different shapes of groove in one pattern make little sense, but with, for instance, conical and spherical bearing surfaces such differences may sometimes be desirable.

Grooves 12 belong to a second pattern of unidirectional grooves further not shown in the drawing, which also has a pumping effect in the direction of smooth bearing surface section 11. Instead of it bearing surface 1 may, depending on the type of bearing or seal, further be smooth or provided with one or more groove patterns, whether or not according to the invention described.

I claim:

1. Bearings and seals with an aerodynamical or hydrodynamical pressure generation in the fluid lubricant between the bearing surfaces, at least one of the bearing surfaces being provided with recesses that form at least one regular groove pattern of unidirectional, shallow grooves for exercising a stemming effect on the lubricant transverse to the direction of movement of the bearing surfaces, the said groove pattern being composed of grooves with a limited length, and the grooves are arranged longitudinally one after another in at least two groups.

2. Bearings and seals according to claim 1, wherein the length of the grooves is at least 10 times their breadth.

3. Bearings and seals according to claim 2, wherein the shortest distance between two grooves situated after one another is at least as great as the shortest distance between two juxtaposed grooves.

4. Bearings and seals of claim 1 wherein the depth of the grooves is smaller than 5 times the average thickness of the lubricant film and the breadth of the grooves and the bearing surface between the grooves is greater than 5 times the average thickness of the lubricant film and the angle of the grooves to the relative direction of movement of the bearing surfaces in about 10° to 40°.

* * * * *